United States Patent [19]

Franzen et al.

[11] 4,282,254

[45] Aug. 4, 1981

[54] DOG FOOD OF IMPROVED ACCEPTABILITY

[75] Inventors: Roger W. Franzen, Pleasantville, N.Y.; Gerald Greber, Westport, Conn.; William C. Rieken, New Milford, N.J.

[73] Assignee: General Foods Corporation, White Plains, N.Y.

[21] Appl. No.: 81,975

[22] Filed: Oct. 4, 1979

[51] Int. Cl.³ .............................................. A23K 1/00
[52] U.S. Cl. ........................................ 426/2; 426/72; 426/74; 426/302; 426/307; 426/623; 426/630; 426/635; 426/805
[58] Field of Search ................ 426/2, 56, 72, 74, 302, 426/307, 623, 630, 635, 805, 650

[56] References Cited

U.S. PATENT DOCUMENTS

| | | |
|---|---|---|
| 3,524,747 | 8/1970 | O'Hara et al. |
| 3,653,908 | 4/1972 | Buck et al. ........................... 426/332 |
| 3,745,023 | 7/1973 | Greenberg et al. .............. 426/805 X |
| 3,857,968 | 12/1974 | Haas et al. ...................... 426/805 X |

FOREIGN PATENT DOCUMENTS 867130  9/1978  Belgium ................................... 426/805

*Primary Examiner*—R. B. Penland
*Attorney, Agent, or Firm*—Mitchell E. Alter; Daniel J. Donovan; Bruno P. Struzzi

[57] ABSTRACT

The object of the invention is to provide a dog food of improved acceptability.

Dog foods, no matter how nutritious, must be palatable for the dogs to receive the proper nutrition. This invention provides a dog food of improved palatability by the use of amino acid palatants selected from the group consisting of L-phenylalanine, L-tyrosine, L-tryptophan, L-methionine, L-arginine, L-isoleucine, L-leucine, L-serine, and any combination of these. The palatant is employed in any effective amount, usually from 0.001 to 0.8 wt. percent, on dry, intermediate-moisture, or canned dog food.

11 Claims, No Drawings

DOG FOOD OF IMPROVED ACCEPTABILITY

DESCRIPTION

1. Technical Field

The present invention relates to dog foods, and particularly to dog foods having additives which make them more acceptable to dogs.

There is a continuing problem in making dog foods acceptable to dogs. While the art is well aware of the nutritional requirements of dogs, foods formulated for them must be made sufficiently acceptable to assure that they are consumed so that the dog can take advantage of their nutritional benefits.

Most of the pet food acceptability enhancers known to the art turn out, after their identification as such, to be components or derivatives of necessary dietary components for the particular animals involved. However, the identification of pet food acceptability enhancers is important industrially because it enables the production of tasty, nutritious pet foods employing large amounts of by-products of the human industry. This helps in maintaining the lowest possible cost for human foods by providing a market for the by-products of that industry while at the same time decreasing the reliance of pet foods on the choicer and more select raw materials. The identification of known food constituents as palatants for particular species of animals in specific amounts is an important aspect of world food supply, and further improvements are needed.

2. Background Art

The use of additives to increase the acceptance of pet foods is well established in the prior art. For example, U.S. Pat. No. 3,857,968 to G. J. Hass et al, discloses incorporating into an animal food an effective amount of a palatability improving composition comprising fat and protein which has been conditioned by emulsifying the fat and treating the mixture with an enzyme mixture comprising lipase and protease. It is known that free fatty acids and amino acids are liberated by the enzymatic reactions; however, the exact reason for the improvement in palatability obtained according to the disclosure of that patent is not fully understood. It is noted that the starting materials are typical dietary components, and the enzymatic reactions which they undergo may heighten their natural attractiveness.

Similarly, in U.S. Pat. No. 3,745,023, to Greenberg et al, it is disclosed that a specially treated fat preparation can improve palatability when applied to pet foods. The patentees suggest that a high concentration of free fatty acids in the fat promotes palatability. Also suggestive of specific types of certain combinations of additive materials are United Kingdom Pat. No. 1,293,378, and Netherlands Pat. No. 73-13644. The United Kingdom patent discloses a synergistic mixture of squalene, oleyl alcohol, oleic acid and linoleic acid for improving the acceptability of livestock and pet foods. The Netherlands patent publication discloses that specific free fatty acids, caprylic and caproic acid, improve the aroma of dog foods.

Amino acids are known to have widely varying aromas and flavors depending on their type and concentration. There is, however, nothing which indicates their inherent attractiveness to dogs. In U.S. Pat. No. 3,653,908 to Buck et al, it is disclosed that amino acids released by the hydrolysis of meat are flavorful to cats, especially when reacted with reducing sugars. J. Boudreau et al in Chemical stimulus Determinants of Cat Geniculate Ganglion Chemoresponsive Group II Unit Discharge, *Chemical Senses and Flavor,* 1 (1975), pages 495–517, and Cat Neural Taste Responses to Nitrogen Compounds, ACS Symposium Series 26 (1976); and White, et al, in Taste Preferences of the Cat for Neuro Physiologically Active Compounds, *Physiological Phychology,* 1975, Vol. 3 (4), pages 405–410, discuss their work in the neurophysiology of the cat wherein they tested cats for taste response to aqueous solutions of a number of compounds, including amino acids. By this work they found several amino acids, including L-proline, L-cysteine and L-histidine, to be taste active in 50 mM solutions under the conditions of testing. Under these same conditions, L-phenylalanine, L-tyrosine, L-tryptophan and L-isoleucine were found to inhibit the same groups of neural units that were excited by the others. In later work disclosed in U.S. patent application Ser. No. 888,795, filed Mar. 21, 1978, commonly assigned and published elsewhere, Boudreau et al determined that L-proline, L-cysteine, L-histidine, L-lysine, inosine 5′-triphosphate, inosine 5′-diphosphate, and adenosine 5′-triphosphate, were taste active in the dog in aqueous solutions. However, tests employing L-lysine at the 1% level and L-proline at the 1% and 3% level on dry dog food, did not make the dog food significantly more preferred by dogs under the conditions of the test. This was explained there on the basis that these materials could be associated with the flavor of raw meat and were overpowered by the cooked meat flavor of the base food.

In a recent Belgian patent publication, No. 867,130 L- and D-lysine are disclosed as palatants for dog foods. However, the effects of the amino acids are not clearly distinguished from those of moisture by the method disclosed.

It is also known in the art to employ various levels of various amino acids to improve the nutrition of various foods deficient in certain of the essential amino acids. This technique for improving the nutritional value of foods has, however, been of limited commercial value in view of the intense and often unpleasant taste of these materials at the levels required to significantly improve nutrition. One canned dog food formulation is known wherein methionine was employed at a level of 0.025% based on the weight of the food; however, no palatability improvement was ever disclosed in connection with this addition which was done for nutritional improvement.

DISCLOSURE OF INVENTION

In accordance with the present invention an improved, nutritionally-balanced dog food is provided which comprises fat, protein, carbohydrates, vitamins and minerals, wherein the improvement comprises: an added amount of amino acids between about 0.001 and 0.8%, selected from the group consisting of L-phenylalanine, L-tyrosine, L-tryptophan, L-methionine, L-arginine, L-isoleucine, L-leucine, L-serine, and combinations of any of these, the amount being effective to increase the palatability of the dog food for dogs.

The term palatability is broad and encompasses all of the various properties of dog foods, sensed by the consuming animal which determine the overall acceptability of the food. Among these properties are texture, taste and aroma. It is believed that the present invention increases palatability as a whole, primarily through improving the taste of the food.

The specific amino acids which are included within the scope of the present invention, will be referred to generically as amino acid palatants. Specifically identified as useful palatants according to the present invention are L-phenylalanine, L-tyrosine, L-tryptophan, L-methionine, L-arginine, L-isoleucine, L-leucine, L-serine, and combinations of these. Preferred among these are L-tryptophan, L-arginine, L-isoleucine, L-leucine, and L-serine, and particularly L-tryptophan, L-arginine, L-isoleucine. These materials can be selected or prepared from any suitable source. It is to be understood that the term amino acid is use herein identifies the noted compounds in their free and/or soluble salt form. It should be cautioned, however, that the method of recovery or preparation of pure or synthetic compounds can alter the effectiveness of the compounds in improving palatability of a dog food.

The amino acid palatants identified by the present invention can be employed in any amount which is effective to improve the palatability of a dog food for dogs. No attempt is made here to establish a range of concentrations of universal applicability for all different types of dog foods for serving under all different types of conditions to all different types of dogs. It is believed that levels within the range of from about 0.001 up to about 0.8%, more preferably from about 0.005 to about 0.5% can be employed with effectiveness, depending on the method of application and the type of food. Levels of from about 0.01 to about 0.1% based on the total weight of the food have been effective for dogs when surface coated or blended into the food. This range is, therefore, considered most preferred. However, effective levels for at least some of the materials identified as palatants by this invention will be outside of this range.

The amino acid palatants are incorporated into the desired food products in any suitable manner. In testing already conducted, it has been found that they can be coated onto the exterior of a food or intimately mixed with the food ingredients prior to final formulation. Those skilled in the art will understand that by placing the palatant on the surface of the foods it will increase its impact as comparred to a product having it incorporated into the interior of the product. Thus, spraying onto the surface of the dog food is the most preferred manner of application where this type of processing step is compatible with the overall processing of the food involved.

It may be necessary to dilute the amino acid palatants with a suitable material prior to application by spraying. The diluent can be either a liquid or a solid component which is compatible with the food. Thus, it can be employed as part of a powderous, emulsified, or other coating such as those which are normally applied to the surface of dry dog foods.

Where it is desired to employ it by mixing into the interior of the dog food, it is again simply accomplished in a manner compatible with normal processing. And, if experience shows that the particular method of addition causes the presence of hot spots or areas of unduly exaggerated concentration due to improper mixing, it may be desireable to dilute the palatant prior to mixing.

The amino acid palatants identified according to the present invention can be employed on dog foods of all varieties. Because providing nutrition is of overriding concern, it is important to formulate all dog foods such that they are nutritionally complete. By nutritionally balancing each individual food in this manner, it is not then necessary for the dog owner to balance the quantities of different foods supplied. Thus, the nutritional intake of the dog is assured so long as it intakes a minimum amount of food. Nutritionally-balanced foods contain protein, carbohydrates, fats, vitamines and minerals in the amounts known in the art and established by feeding tests to be sufficient for the proper growth and maintenance of the dog.

The amino acids palatants identified according to this invention can be employed in dry, intermediate-moisture or canned dog foods. The dry dog foods contain less than 15% moisture, and will typically have a dry, crunchy texture due to the maintenance of the moisture below about 8%. The intermediate moisture foods will have moisture above 15% and less than about 50%, and will typically have a soft texture with moisture contents in the range of from 20 to 30%. The canned foods have moistures above 50% and typically about 75%.

Typical of the dry dog foods are those disclosed in U.S. Pat. No. 3,119,691. Disclosed in this patent is a dry pet food having a gravy-forming coating thereon. It is desirable to include the palatant in the gravy-forming material such that it will disperse within the gravy in the serving bowl. Also suitable for incorporation of the amino acid palatants are the intermediate-moisture dog foods of the type disclosed in U.S. Pat. No. 3,202,514 to Burgess et al. In preparing these types of foods, the palatant can either be mixed intimately during the process prior to extrusion or coated on the exterior thereof. The palatants identified according to the present invention can also be employed in conventional canned dog foods by adding them in any suitable manner.

BEST MODE FOR CARRYING OUT THE INVENTION

The following examples set forth the best mode for carrying out the invention. These examples are intended to aid in describing the present invention to those skilled in the art and are not to be taken as limiting in any regard. Unless otherwise indicated, all parts and percentages are by weight.

EXAMPLE I

According to this example, the effect of various amino acids on the palatability of a dry dog food formulated for normal adult dogs is tested on normal adult dogs by incorporating into the food, as a portion of a fat coating, small but effective amounts of the amino acids and testing them against a control product.

As the base dog food, an uncoated, extruder-kibbled product which forms the core of the commercially available Gravy Train (Trademark) brand dog food is employed.

This formulation is prepared and processed in the manner described in the aforementioned U.S. Pat. No. 3,119,691 except that the coating taught therein is omitted. To prepare a test food coating containing a palatant according to this invention, 0.1% of the amino acid, 3% distilled water and 6% of bleachable fancy tallow, all percentages based on the total weight of the food, are emulsified and then sprayed onto the kibbled dog food as it is tumbled in a rotating drum. A control product is also prepared in the same manner but without the amino acid.

The amino-acid treated samples were then split into four groups with controls as follows:

| Group 1 | Group 2 | Group 3 | Group 4 |
|---|---|---|---|
| 1/L-Alanine | 1/Control | 1/L-Leucine | 1/Control |
| 2/Control | 2/Glutamine | 2/L-Lysine | 2/L-Serine |
| 3/L-Arginine | 3/L-Glutamic Acid | 3/L-methionine | 3/L-Threonine |
| 4/L-Asparagine | 4/Glycine | 4/Control | 4/L-Tyrosine |
| 5/Aspartic Acid | 5/L-Histidine | 5/L-Phenylalanine | 5/L-Tryptophan |
| 6/L-Cysteine | 6/Control | 6/L-Proline | 6/Control |
| 7/Control | 7/L-Isoleucine | 7/Control | 7/L-Valine |

For each of the four Groups, seven, three-way comparison tests were arranged as shown below:

| Group 1 | Group 2 | Group 3 | Group 4 |
|---|---|---|---|
| 6 / 7 / 2 | 3 / 4 / 6 | 3 / 1 / 7 | 1 / 3 / 7 |
| 4 / 5 / 7 | 5 / 6 / 1 | 5 / 3 / 2 | 5 / 7 / 4 |
| 3 / 4 / 6 | 2 / 3 / 5 | 4 / 2 / 1 | 2 / 4 / 1 |
| 2 / 3 / 5 | 7 / 1 / 3 | 6 / 4 / 3 | 4 / 6 / 3 |
| 1 / 2 / 4 | 6 / 7 / 2 | 7 / 5 / 4 | 3 / 5 / 2 |
| 5 / 6 / 1 | 1 / 2 / 4 | 1 / 6 / 5 | 7 / 3 / 6 |
| 7 / 1 / 3 | 4 / 5 / 7 | 2 / 7 / 6 | 6 / 1 / 5 |

Thus, for each of the groups containing five different amino acids, each amino acid is fed three times within the group and each control is fed twice within the group. Each group was fed to 40 dogs daily for two consecutive days. For the seven, three-way comparisons in each group, the first five were fed to six dogs and the last two were fed to five dogs, making a total of 40 dogs per day.

The data was analyzed both for average rank and average preference ratio for each product over two days of testing. In determining the average rank, a rank of 3 was assigned, for each dog to the product with the highest consumption on the two days, a rank of 2 was assigned to the product with the second highest consumption on the two days, and a rank of 1 was assigned to the product with the lowest consumption on the two days. If all products are equally preferred then the ranks for all products would be near 2.0. High ranks indicate products with high preference and low ranks indicate products with low preference. The average ranks for all products are listed in Table 1.

The average preference ratios (APR) indicate the relative weights of the various foods consumed in each three-way comparison. To determine the APR, the preference ratio for each three-way comparison is first determined by dividing the weight of one sample consumed by total weight of all foods consumed. The APR is simply the average of the preference ratios for a particular food over the term of testing. The APR values are also listed in Table 1.

TABLE 1

| Test Group | Amino Acids | Rank For Dog Groups 1 | 2 | 3 | 4 | 5 | 6 | 7 | Average Rank | APR |
|---|---|---|---|---|---|---|---|---|---|---|
| 1 | L-Alanine |  |  |  |  | 2.0 | 2.0 | 2.0 | 2.0 | .30 |
| | Control | 1.7 |  |  | 1.6 | 1.5 |  |  | 1.6 | .26 |
| | L-Arginine |  |  | 2.7 | 2.8 |  |  | 2.8 | 2.8 | .49 |
| | L-Asparagine |  | 2.4 | 1.8 |  | 2.5 |  |  | 2.2 | .37 |
| | Aspartic Acid |  | 1.2 |  | 1.6 |  | 1.4 |  | 1.4 | .22 |
| | L-Cysteine | 2.7 |  | 1.6 |  |  | 2.6 |  | 2.3 | .44 |
| | Control | 1.7 | 2.4 |  |  |  |  | 1.2 | 1.8 | .26 |
| | Control |  | 2.0 |  | 1.3 |  | 2.2 |  | 1.8 | .30 |
| | Glutamine |  |  | 1.7 |  | 1.6 | 2.6 |  | 2.0 | .31 |
| | L-Glutamic Acid | 2.2 |  | 2.0 | 2.2 |  |  |  | 2.1 | .32 |

TABLE 1-continued

| Test Group | Amino Acids | Rank For Dog Groups 1 | 2 | 3 | 4 | 5 | 6 | 7 | Average Rank | APR |
|---|---|---|---|---|---|---|---|---|---|---|
| 2 | Glycine | 1.8 |  |  |  |  | 1.2 | 1.2 | 1.4 | .24 |
| | L-Histidine |  | 1.2 | 2.3 |  |  |  | 1.8 | 1.8 | .31 |
| | Control | 2.0 | 2.8 |  |  | 1.6 |  |  | 2.1 | .37 |
| | L-Isoleucine |  |  |  | 2.5 | 2.8 |  | 3.0 | 2.8 | .48 |
| | L-Leucine | 2.8 |  | 2.6 |  |  | 2.4 |  | 2.6 | .49 |
| | L-Lysine |  | 2.2 | 1.8 |  |  |  | 1.0 | 1.7 | .22 |
| | L-Methionine | 1.2 | 2.8 |  | 1.9 |  |  |  | 2.0 | .30 |
| 3 | Control |  |  | 1.7 | 1.5 | 2.5 |  |  | 1.9 | .24 |
| | L-Phenyl-alanine |  | 1.0 |  |  | 1.0 | 1.2 |  | 1.1 | .22 |
| | L-Proline |  |  | 2.6 |  | 2.4 | 3.0 |  | 2.7 | .53 |
| | Control | 1.9 |  |  | 2.5 |  | 2.0 |  | 2.1 | .31 |
| | Control | 2.0 | 1.8 |  |  | 1.8 | 1.4 |  | 1.7 | .29 |
| | L-Serine |  |  | 2.9 |  | 1.8 | 2.8 |  | 2.5 | .43 |
| | L-Threonine | 2.2 |  | 1.2 | 1.5 |  |  |  | 1.6 | .26 |
| 4 | L-Tyrosine |  | 2.0 | 1.3 | 1.8 |  |  |  | 1.7 | .27 |
| | L-Tryptophan |  | 2.8 |  | 2.8 |  | 3.0 |  | 2.9 | .49 |
| | Control |  |  | 3.0 |  | 2.0 | 1.6 |  | 2.2 | .36 |
| | L-Valine | 1.8 | 1.2 |  |  |  | 1.2 |  | 1.4 | .22 |

The data was analyzed with the aid of Durbin's $X^2_r$ test for ranked data from a balanced incomplete block design to determine differences between the ranks. The statistical testing dincidated significant differences in the preferences of the products in four test groups at the 99.5 percent level of confidence. At this level, the chance of observing these results if all products are equally preferred is less than 1 in 200. The relative preferences of the amino acids are:

Preferred to control:
  L-Arginine
  L-Isoleucine
  L-Leucine
  L-Proline
  L-Serine
  L-Tryptophan
Less preferred than control:
  Aspartic Acid
  Glycine
  L-Phenylalanine
  L-Valine

EXAMPLE II

A further series of dog food samples were prepared containing the amino acids at the levels indicated in Table 2. The type of dog food and manner of incorporation of amino acid are also shown. IM means intermediate-moisture, D means dry, I means incorporated internally, and S means surface coated. Some samples were fed as is "A" and some with an equal weight of water as indicated by "1:1" in the table. In the results column, "P" means significant Preference, "L" means significant loss and "N" means no satistically significant difference for that test run.

TABLE II

| Amino Acid | Level | Food Type | How Fed | Result |
|---|---|---|---|---|
| | .1 | IM-I | A | P |
| | .01 | IM-I | A | P |
| | .01 | IM-I | A | P |
| | .01 | IM-I | A | P |
| | .1 | D-S | 1:1 | P |
| | .01 | D-S | 1:1 | L |
| L-Cysteine | .001 | D-S | 1:1 | P |
| | .1 | D-I | 1:1 | P |
| | .01 | D-I | 1:1 | N |
| | .001 | D-I | 1:1 | N |
| | .05 | IM-S | A | P |
| | .1 | IM-S | A | P |

TABLE II-continued

| Amino Acid | Level | Food Type | How Fed | Result |
|---|---|---|---|---|
| | .01 | D-S | A | P |
| | .1 | D-S | A | P |
| | .1 | D-S | A | P |
| | .001 | IM-I | A | N |
| | .01 | IM-I | A | P |
| | .1 | IM-I | A | P |
| L-Phenyla- | .01 | IM-I | A | P |
| lanine | .05 | IM-I | A | P |
| | .1 | D-I | A | N |
| | .01 | D-I | A | N |
| | .1 | D-S | A | N |
| L-Threonine | .1 | D-S | A | N |
| L-Tyrosine | .01 | IM-I | A | P |
| | .1 | IM-I | A | N |
| L-Trypotophan | .01 | IM-I | A | P |
| | .1 | IM-I | A | P |
| | .01 | IM-I | A | P |
| L-Methionine | .1 | IM-I | A | P |
| | .1 | D-S | A | P |
| L-Arginine | .1 | D-S | A | N |
| L-Proline | .1 | D-S | A | P |
| L-Serine | .1 | D-S | A | N |
| Glycine | .1 | D-S | A | N |

The above description is for the purpose of teaching those skilled in the art how to practice the present invention and is not intended to recite all the possible modifications and variations thereof which will become apparent to the skilled worker upon reading. It is intended, however, that all such modifications and variations be included within the scope of the invention which is defined by the following claims:

We claim:

1. In a nutritionally-balanced dog food consisting essentially of fat, protein, carbohydrates, vitamins and minerals, the improvement wherein the dog food contains an amino acid selected from the group consisting of L-tryptophan, L-arginine, L-isoleucine, L-leucine, L-serine, and combinations of any of these in an amount between about 0.001% to 0.8%, the amount being effective to increase the palatability of the dog food for dogs.

2. A nutritionally-balanced dog food according to claim 1 having a moisture content of less than 15% by weight.

3. A nutritionally-balanced dog food according to claim 1 wherein the moisture content is between about 15 and about 50% by weight.

4. A nutritionally-balanced dog food according to claim 1 having a moisture content in excess of 50% by weight.

5. A nutritionally-balanced dog food according to claim 1 wherein the amino acid is selected from the group consisting of L-tryptophan, L-arginine, L-isoleucine, L-leucine, L-serine, and combinations of these.

6. A nutritionally-balanced dog food according to claim 5 wherein the amino acid is selected from the group consisting of L-tryptophan, L-arginine, L-isoleucine, and combinations of these.

7. A nutritionally-balanced dog food according to claim 1 wherein the amino acid is added in an amount of from about 0.005 to about 0.5% based upon the weight of the dog food.

8. A nutritionally-balanced dog food according to claim 1 wherein the amino acid is incorporated internally in the food.

9. A nutritionally-balanced dog food according to claim 1 wherein the amino acid is coated on the exterior of the food.

10. An improved method for feeding a dog comprising:
   (a) preparing a nutritionally-balanced dog food consisting essentially of fat, protein, carbohydrates, vitamins and minerals, the improvement wherein the dog food contains an amino acid, selected from the group consisting of L-tryptophan, L-arginine, L-isoleucine, L-leucine, L-serine, and combinations of any of these in an amount between 0.001% to 0.8%, the amount being effective to increase the palatability of the dog food for dogs; and
   (b) feeding said dog food to a dog.

11. A nutritionally-balanced dog food with a moisture content of less than 50% consisting essentially of fat, protein, carbohydrates, vitamins and minerals, the improvement wherein the dog food contains L-methionine in the amount between about 0.005% to 0.5%, the amount being effective to increase the palatability of the dog food for dogs.

* * * * *